(12) United States Patent
Wescombe-Down

(10) Patent No.: US 7,270,083 B2
(45) Date of Patent: Sep. 18, 2007

(54) SHARK REPELLING DEVICE

(75) Inventor: Michael Wescombe-Down, Glenela North (AU)

(73) Assignee: Seachange Technology Holdings Pty Ltd, South Australia (AU)

( * ) Notice: Subject to any disclaimer, the term of this patent is extended or adjusted under 35 U.S.C. 154(b) by 0 days.

(21) Appl. No.: 10/485,052

(22) PCT Filed: Jul. 26, 2002

(86) PCT No.: PCT/AU02/00987

§ 371 (c)(1),
(2), (4) Date: Jul. 28, 2004

(87) PCT Pub. No.: WO03/011025

PCT Pub. Date: Feb. 13, 2003

(65) Prior Publication Data

US 2005/0000465 A1    Jan. 6, 2005

(30) Foreign Application Priority Data

Jul. 27, 2001    (AU) ................................ PR6633

(51) Int. Cl.
*A01K 61/00* (2006.01)
(52) U.S. Cl. ...................... 119/220; 119/219
(58) Field of Classification Search .......... 119/220, 119/219
See application file for complete search history.

(56) References Cited

U.S. PATENT DOCUMENTS

| | | | |
|---|---|---|---|
| 948,355 A * | 2/1910 | Tatro et al. ............... | 205/694 |
| 2,745,205 A * | 5/1956 | Kafka ........................ | 43/17.1 |
| 2,808,674 A * | 10/1957 | Vang ......................... | 43/17.1 |
| 3,164,772 A | 1/1965 | Hicks et al. | |
| 3,265,972 A | 8/1966 | Curry | |
| 3,683,280 A | 8/1972 | Holt | |
| 3,822,403 A | 7/1974 | Coleman et al. | |
| 4,211,980 A | 7/1980 | Stowell | |
| 4,471,552 A * | 9/1984 | McIntosh et al. ............. | 43/4 |
| 5,445,111 A * | 8/1995 | Smith ........................ | 119/220 |
| 5,448,968 A * | 9/1995 | Ostlie ....................... | 119/220 |
| 6,837,182 B2 * | 1/2005 | Leblanc ..................... | 119/220 |

FOREIGN PATENT DOCUMENTS

| | | |
|---|---|---|
| AU | 669806 | 6/1994 |
| WO | WO93/00003 | 1/1993 |

OTHER PUBLICATIONS

JP08092933, Hatano Hitoshi, (Nippon Solid KK) Apr. 9, 1996.

* cited by examiner

*Primary Examiner*—Michael J. Carone
*Assistant Examiner*—Bret Hayes
(74) *Attorney, Agent, or Firm*—Klauber & Jackson L.L.C.

(57) ABSTRACT

A device (10) for repelling selected aquatic creatures, such as sharks. The device consists of an electromagnetic field generator (21, 30) for generating an electromagnetic field (50) that repels sharks and is supported by a buoyant device (20). This provides a shark-free region about the device (10). Multiple devices can be connected together to form an array of repelling devices, thereby extending the shark-free region.

13 Claims, 8 Drawing Sheets

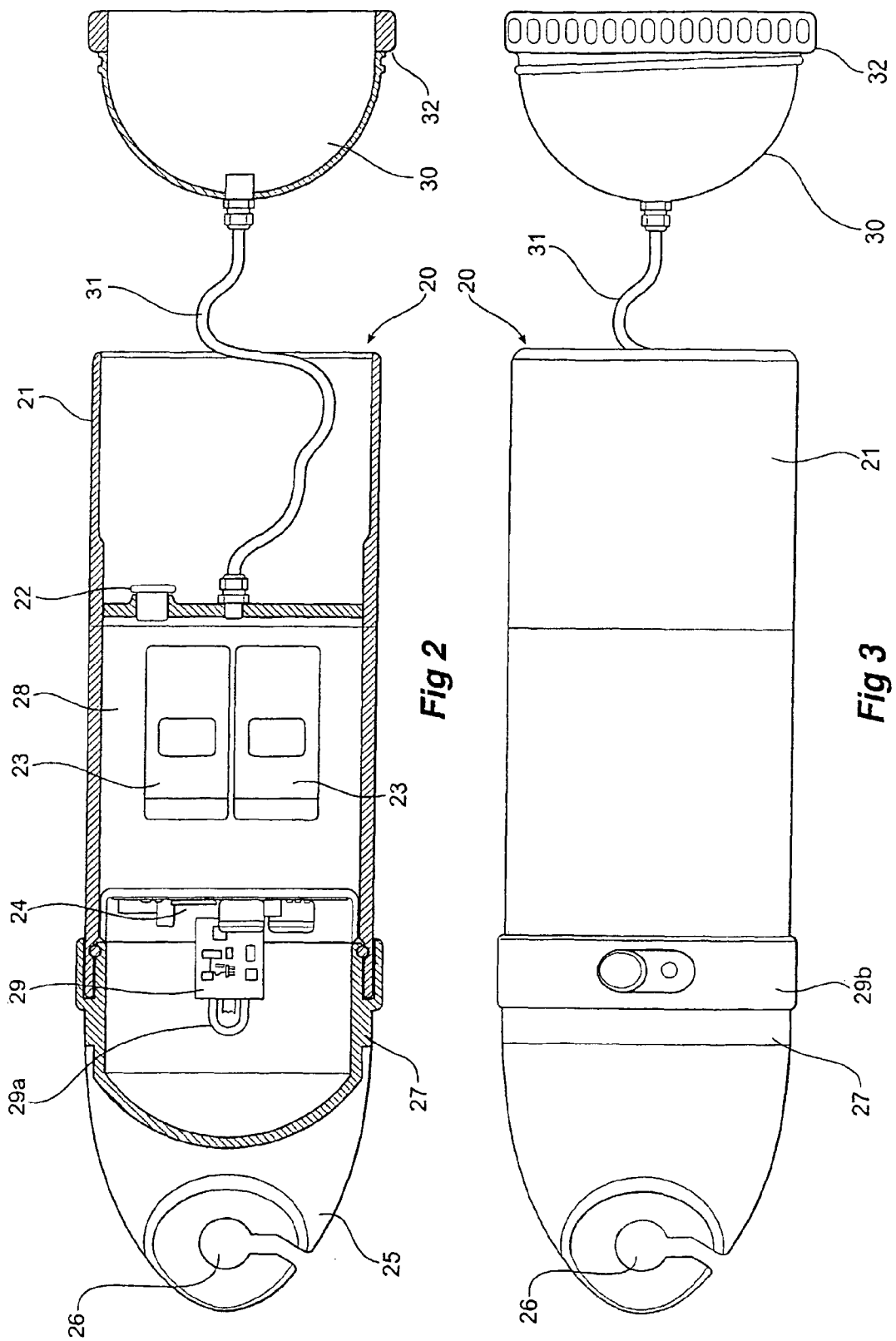

SHARK REPELLING DEVICE

FIELD OF THE INVENTION

This invention relates to devices for repelling selected aquatic creatures, in particular sharks.

BACKGROUND OF THE INVENTION

Ever since humans have ventured into the sea for exploration, hunting and recreation, a constant danger has been the risk of attack by dangerous sea creatures, in particular sharks. Such attacks, while not common, can be fatal and in many cases if not fatal, can result in horrific injuries to the victim which remain for a lifetime.

Furthermore, sharks often hinder fishing expeditions as they are attracted to bait used to catch fish, and to the movement of fish being caught. In instances where nets are used, shark attacks may also result in the loss of any fish caught, as well as damage to the nets.

DISCUSSION OF PRIOR ART

A number of attempts have been made to address one or more of the above problems with varying degrees of success. These attempts range from divers wearing armour-like suits to minimise damage to themselves in the event of an attack, to the distribution of chemicals in the surrounding water to repel sharks. These approaches have had limited success in the past.

A more effective approach is based on the recognition that sharks are highly sensitive to certain electromagnetic fields.

A number of devices have been developed which can generate electromagnetic fields which create a zone in which sharks are uncomfortable and which sharks accordingly avoid. These devices may be carried by the diver either as a separate hand held device, or as a part of the scuba equipment attached to the back of the diver.

An example of such a device is described in Australian Patent No. 669806 to Natal Sharks Board. In the device, an electromagnetic field is created between a first and a second electrode immersed in a body of water, by passing a pulsed electrical current between the electrodes. These and other like devices provide an effective means of repelling sharks from a region about the diver.

A disadvantage of such devices however is that these devices may be bulky and, if hand held, will impede the diver's actions underwater. Furthermore, such devices are not generally used by amateur water users such as beach goers, or by fisherman, who themselves do not enter the water.

It would accordingly be advantageous to provide a device and method of repelling sharks which allow swimmers or divers to be unhindered when in the water and to provide a more general shark-free zone.

SUMMARY OF THE INVENTION

According to a first aspect of the present invention, there is provided a device for repelling selected aquatic creatures, the device comprising an electromagnetic field generator for generating an electromagnetic field which repels selected aquatic creatures, and a buoy supporting the electromagnetic field generator within a body of water when in use, being separated from a user.

Preferably the buoy includes a first electrode and a second electrode which, in use, make electrical contact with the body of water.

Preferably, at least the first electrode is a conductive outer cover of the buoy.

Preferably, the second electrode is a drop-down electrode.

The buoy may include an on-board power supply or alternatively, may be connectable to an external power supply for providing power to the electric field generator.

The buoyancy of the buoy is advantageously variably adjustable.

Preferably the buoy will include one or more tether points to allow the buoy to be tethered to an object, including one or more other buoys.

According to a second aspect of the present invention, there is provided a repelling array for repelling selected aquatic creatures, the array comprising a plurality of repelling devices according to the first aspect of the present invention, wherein the plurality of repelling devices are tethered together.

The repelling array may define a row, plane or a volume.

Preferably, the selected aquatic creature is a shark.

According to a third aspect of the present invention, there is provided a method of repelling selected aquatic creatures, the method comprising attaching an electromagnetic field generator that generates an electromagnetic field which repels selected aquatic creatures to a buoy, separated from a user for use in a body off water.

BRIEF DESCRIPTION OF THE DRAWINGS

A preferred embodiment of the present invention will now be described in more detail with reference to the following drawings in which:

FIG. 2 shows the interior of the device of FIG. 1;

FIG. 3 shows the exterior of the device of FIG. 1 in more detail;

DETAILED DESCRIPTION OF THE PREFERRED EMBODIMENT

Figure 1:
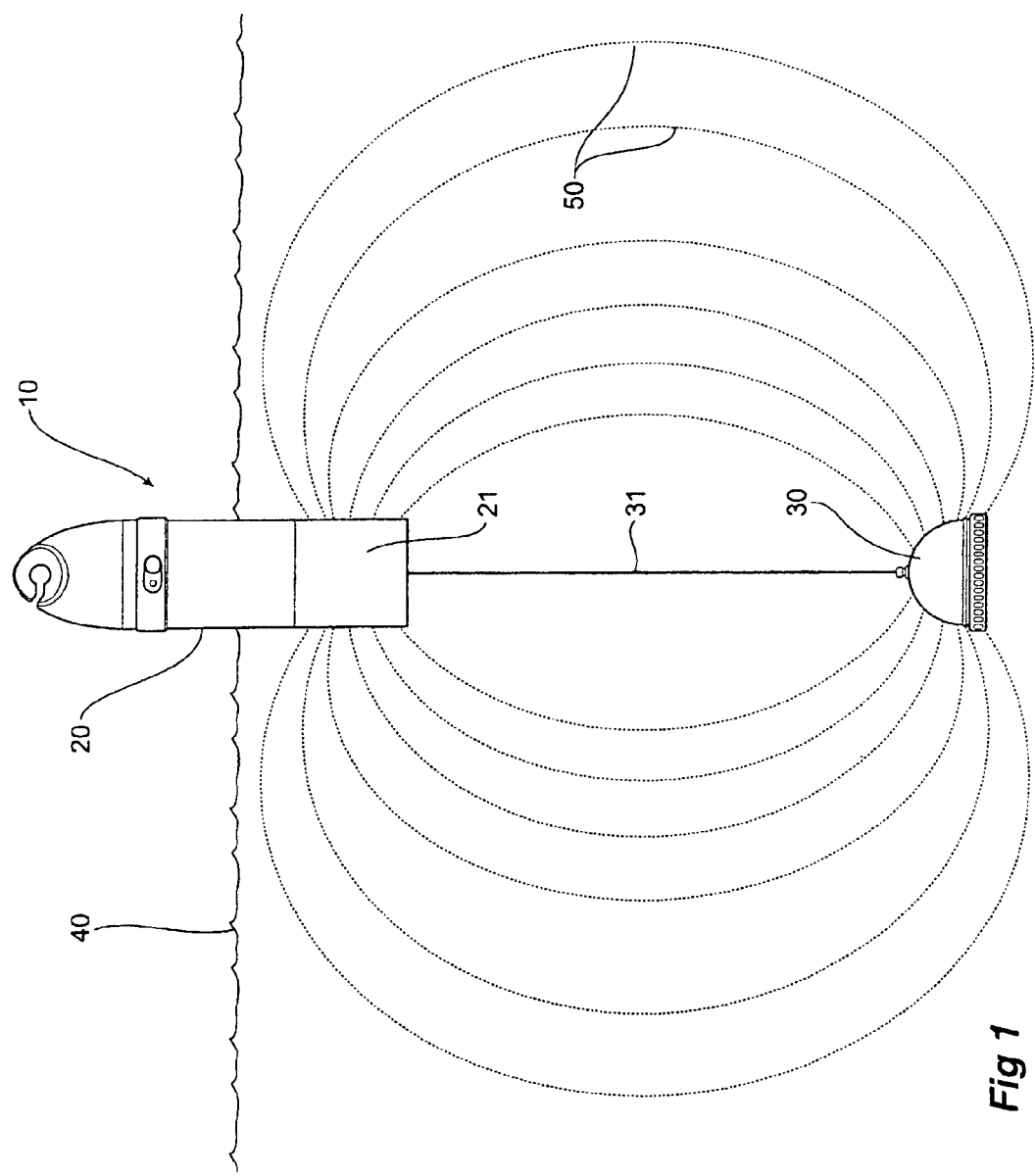
FIG. 1 shows the device of the present invention in use in a body of water.

FIG. 1 shows a typical arrangement in which the device 10 of the present invention may be used. The electromagnetic field generator (not shown) is encased in buoy 20, which in use, floats at the surface of a body of water 40. A portion of the casing of buoy 20 is electrically conductive, and forms a first electrode 21. When operational, a drop electrode 30, extends below buoy 20 to form a second electrode spaced from the first electrode 21, to create an electromagnetic field, shown generally at 50, between electrodes 21 and 30 and within the conductive body of water 40.

This generated electromagnetic field repels sharks, thus forming a shark-free region about the device 10.

Turning now to FIG. 2, it can be seen that buoy 20 encases any suitable electromagnetic field generator 24 to generate electromagnetic fields which will repel sharks. A generator of choice is that described in Australian Patent No. 669806, to Natal Sharks Board, the contents of which are hereby incorporated by reference.

Generator 24 (and any other electrical devices on board) are powered by two 12 volt gel cell batteries 23, encased in a moulded polyurethane foam support pack 28. Alternatively, power for generator 24 may be supplied by an external source, connected via access port 22. Port 22 may also be used to recharge batteries 23, should rechargeable batteries be used.

Unit 29 controls a strobe light 29a, which is visible through transparent polycarbonate strobe window 27. Strobe light 29a is used to indicate the position of the device 10 in dark or unclear conditions. Strobe light 29a may emit a constant light, or may strobe on and off, as may be desired. The function of strobe light 29a is controlled by magnetic switches, activated by slipring 29b (see FIG. 3).

The outer shell of the base of buoy 20 is made of 316 stainless steel, and forms the first electrode 21. Of course, any other suitable conductive material may be used in its place. The base of buoy 20 is hollow to accommodate a second electrode 30. Electrode 30 is a drop electrode, and is connected to buoy 20 via cable 31. Upon actuation, electrode 30 is released from its chamber in buoy 20 and descends into the body of water 40 to a depth determined by the length of cable 31. Electrode 30 is retained and released from its housing in buoy 20 via a quick turn release mechanism 32. Again, any other suitable means may be used, including an automatic release mechanism which may be actuated remotely.

A fully covered device 10 of FIG. 2 is shown in FIG. 3, where the transparent polycarbonate strobe window 27 (covering strobe light 29a) can be seen. Actuating slip ring element 29b is also shown.

Figure 6:
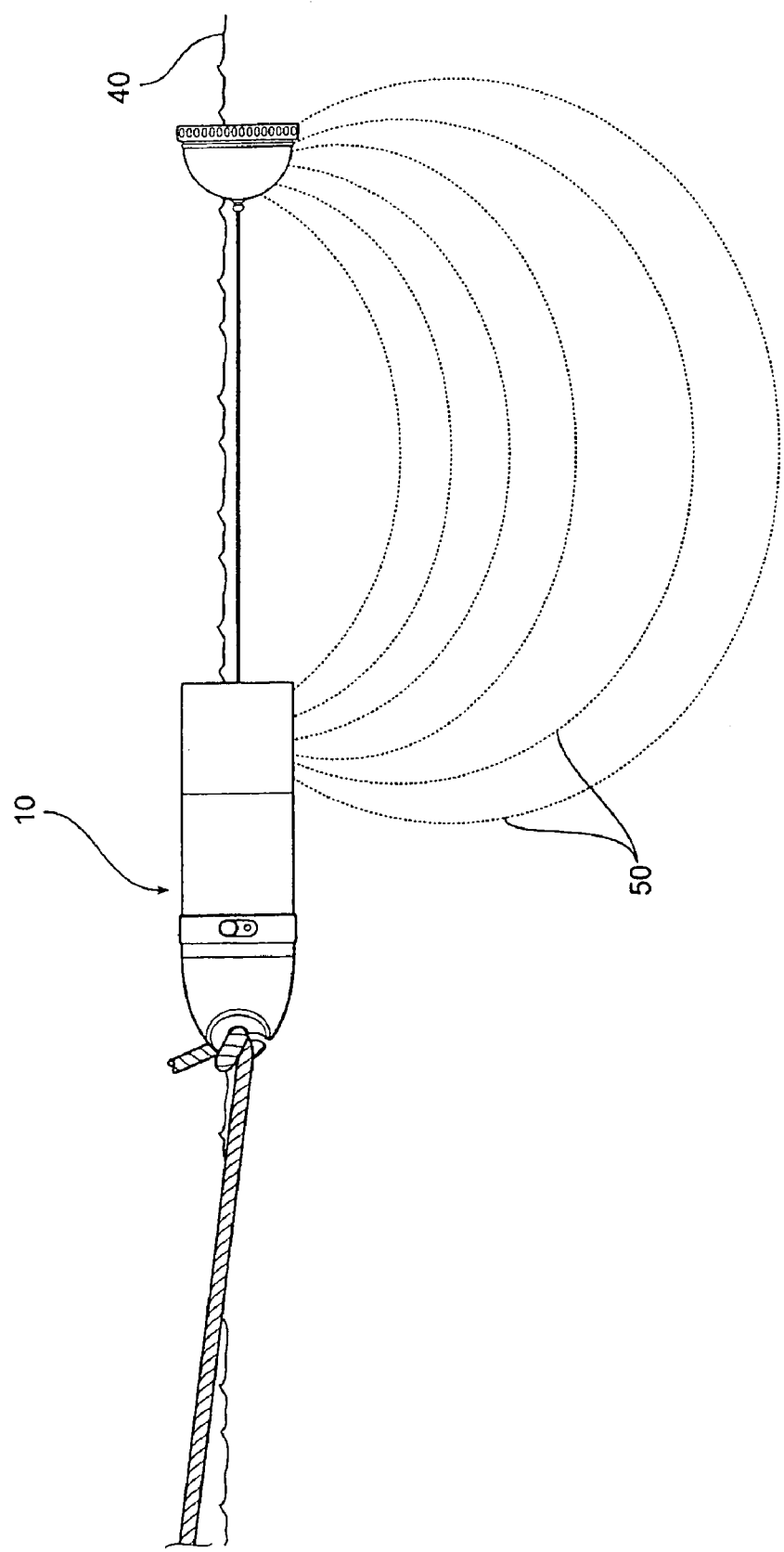
FIG. 6 shows the device of FIG. 1 being towed in a body of water.

Buoy 20 is preferably torpedo shaped to facilitate its movement through the water when being towed by a craft such as a boat. Such a scenario is shown in FIG. 6.

The tip of buoy 20 is an elastomer bump cone 25, having tether eyelets 26. This allows device 10 to be tethered to a boat, a stable base, or one or more other devices 10.

Figure 4:
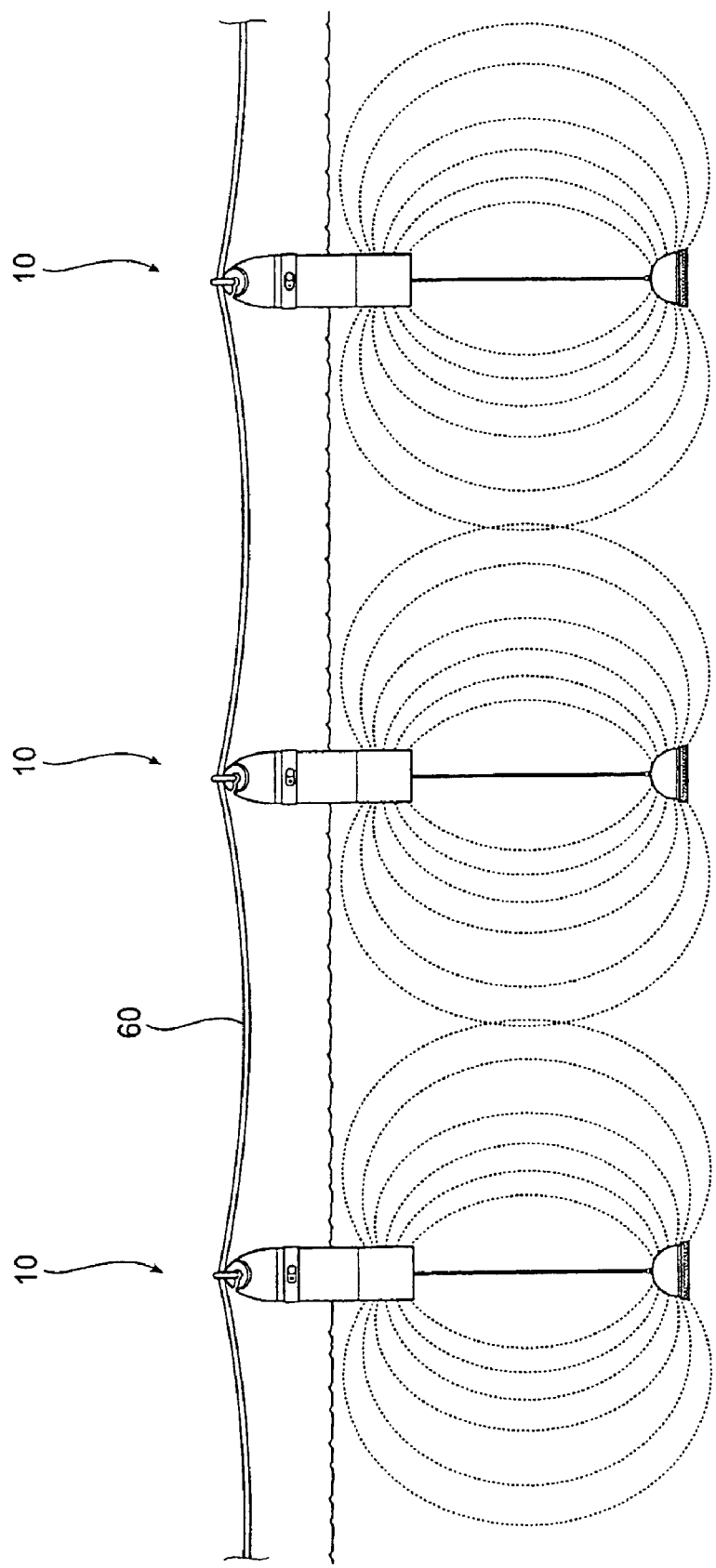
FIG. 4 shows a series of devices according to the present invention, tethered together to form a shark-free path.
Figure 5:
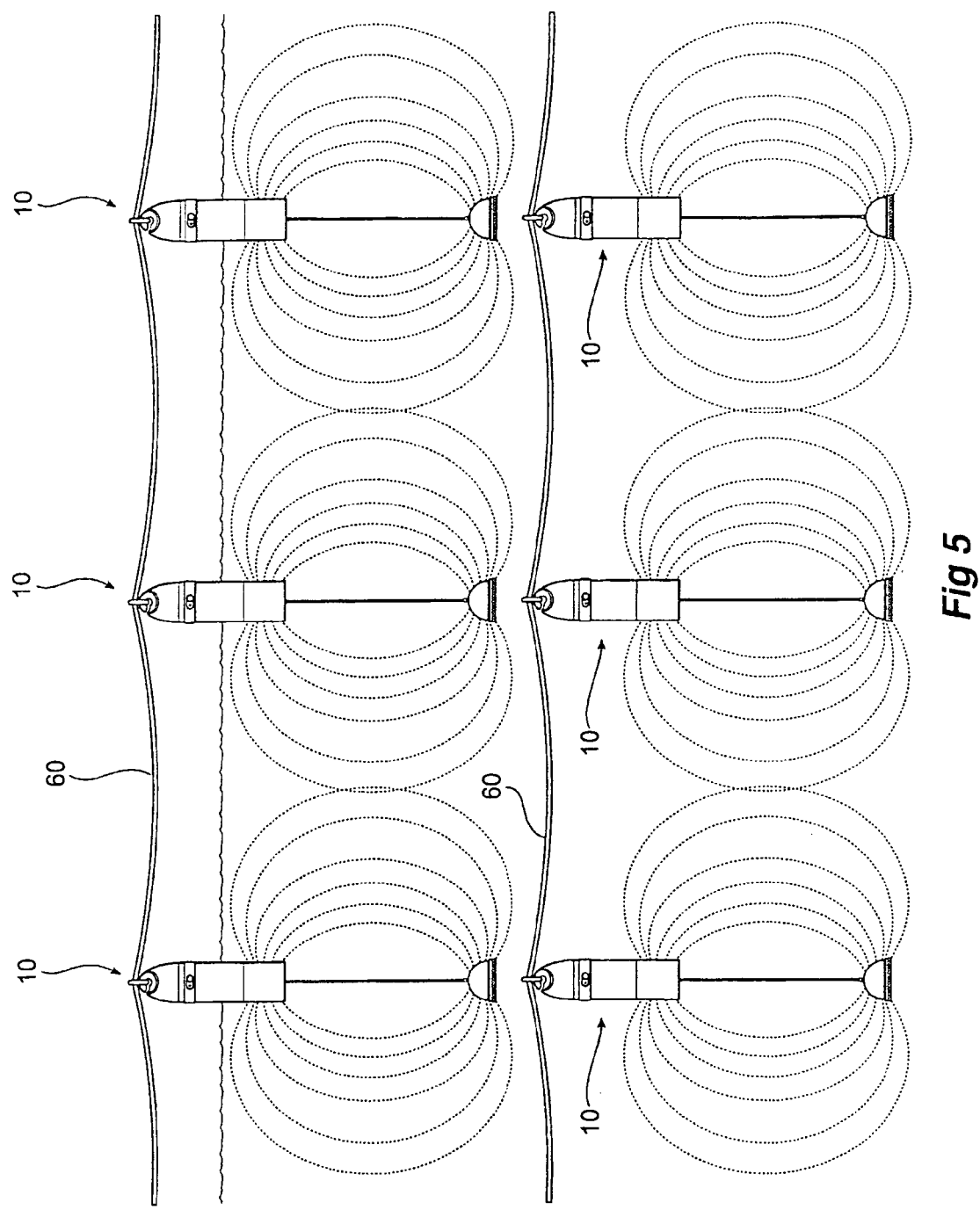
FIG. 5 shows a series of devices according to the present invention, tethered together to form a shark-free wall or plane.

An arrangement in which multiple devices 10 are tethered together is shown in FIGS. 4 and 5. In FIG. 4, there is shown a number of devices 10 tethered together by tether lines 60 in a line across the surface of the body of water. The arrangement shown provides a shark-free zone defining a path parallel to the surface of the water.

It is possible to weight device 10 (either externally or internally) to cause device 10 to attain a position below the surface of the water. In this way, a shark-free zone may be created at any desired depth within the water. In FIG. 5, there is shown the arrangement of FIG. 4 plus a similar arrangement located below the first arrangement to form a shark-free zone which defines a wall or plane, perpendicular to the surface of the water. The wall or plane may extend as far as is desired. Such a wall can be utilised to provide a barrier to an area of water used by swimmers. For example, an area of a beach may be cordoned off in this way to prevent sharks from entering the region used by swimmers. A three dimensional "cage" may also be set up to provide a shark free volume, which may be useful for diving expeditions.

In commercial fishing, devices of the present invention can be connected to nets which will provide a shark-free region about the net thus preventing sharks from scavenging any fish caught by the nets.

Figure 7:
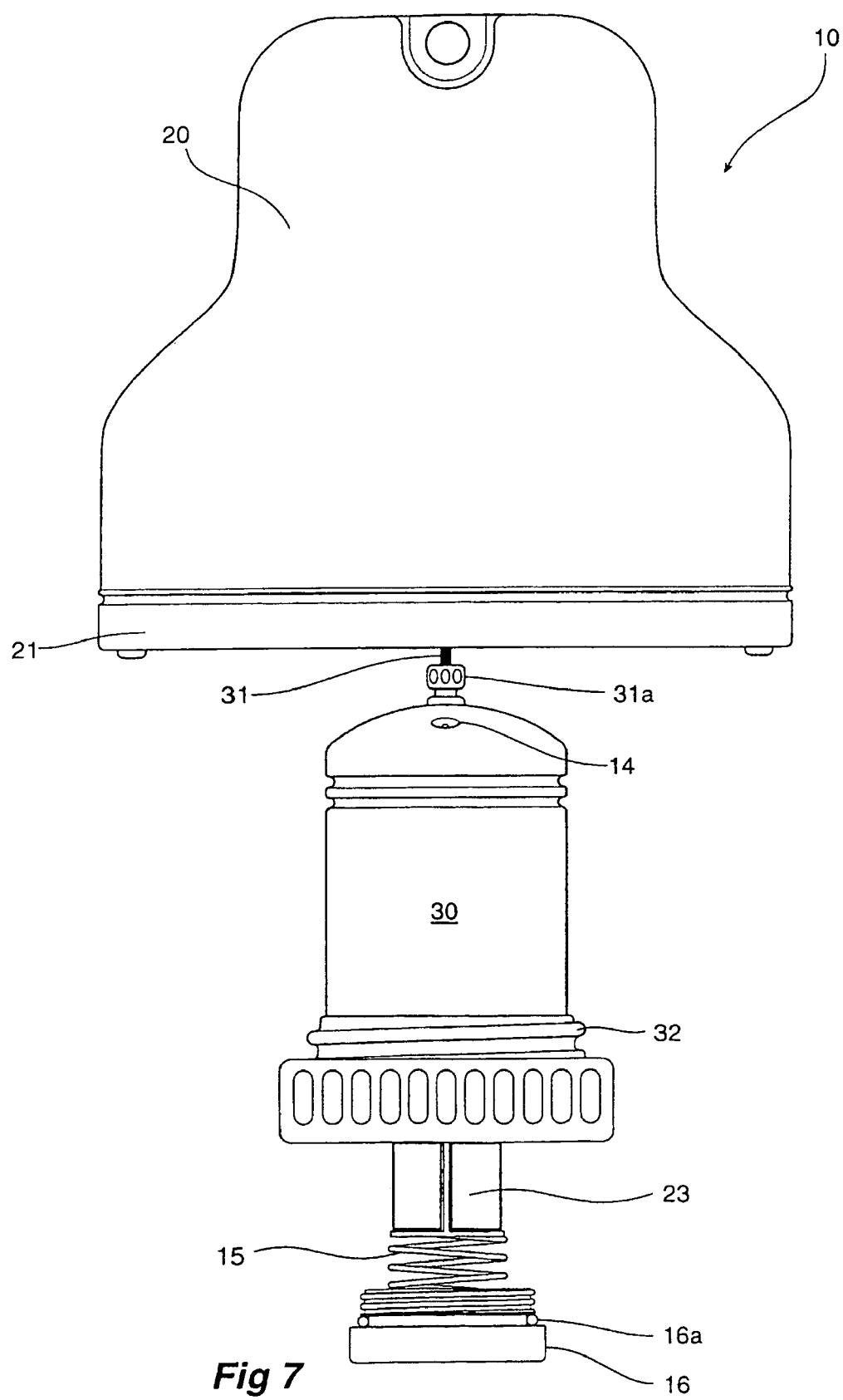
FIG. 7 shows an alternative form of the present invention.
Figure 8:
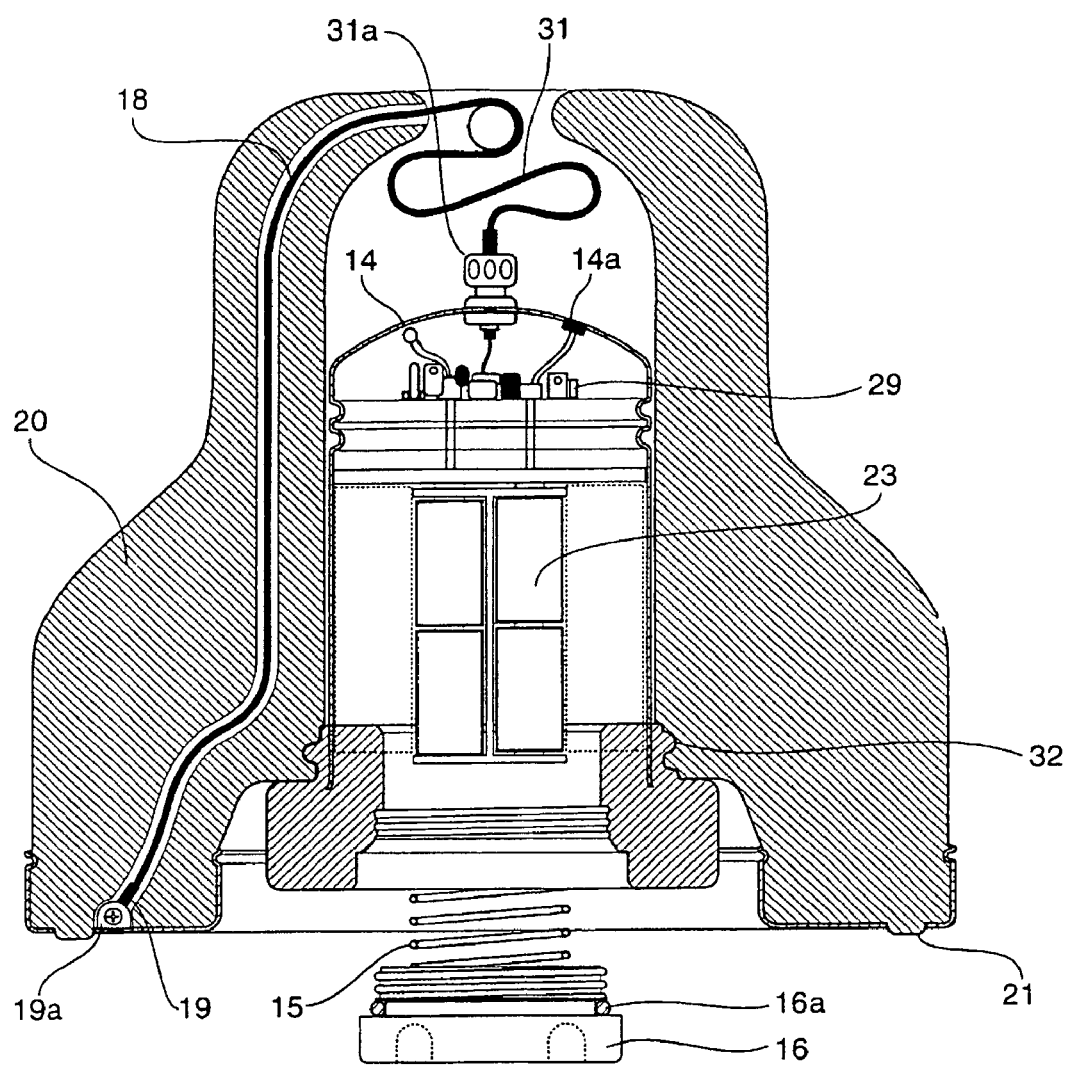
FIG. 8 shows the interior of the device of FIG. 7.

FIGS. 7 and 8 illustrate an alternative version of the buoy of the present invention. Like elements have been labelled accordingly with respect to the previous figures. In this version, the buoy is provided as a smaller package which may be carried by an individual at the beach, and set up in-situ in an area where that individual will swim. The size of such a device could conceivably range from an esky-size to a drinks container size.

The device 10 is made up of two main parts, buoy 20 and base electrode 30. These may be locked together for transport, and unlocked when ready to place in the water.

The base electrode module 30 is essentially a stainless steel flask fitted with a plastic base 32 that functions as a screw-in retaining lock as well as an access port for the battery pack 23a. The flask has a small window 14 on the top surface, with a clear flush mounted lens for a battery status LED and a second portion 14a (see FIG. 8) located at 180° around the flask with electrical contacts exposed to allow sea water to trigger the main switch on the unit.

The flask is constructed with several external circular grooves that form friction ridges on the inside, these in turn act as retainers to hold the fully potted PCB 29 in place. The epoxy-potting compound is poured in-situ when the PCB 29 and ancillaries are in place. This acts as a completely waterproof monolithic mass and adds both weight to the drop electrode and effective insulation and shock protection.

A guide and retaining liner is fitting inside the flask to secure the battery packs 23. These may be 8 cell disposable or 10 cell rechargeable. The battery makes contact with conductive buttons that protrude from the potted section. A stainless steel spring pushes on the base of the battery pack and the spring is tensioned by an 'O' ring sealed screw in cap 16. This also acts as a waterproof seal to the inner chamber.

At the top of the flask is a single pin connector 31a fitted to a flexible heavy-duty waterproof cable 31 approximately 1.5 meters in length. A screw-on connector is fitted to allow cable replacement in the event of damage. The cable 31 loops over the body of a tubular retainer at the top of the buoy and runs down an access groove 18 moulded into the flat face of one of the hemi formed chambers of the float. It terminates onto a waterproofed lug 19 that is riveted or bolted to a tab 19a spot-welded to the electrode 20.

The float is constructed from two identical hemi section forms in a fluorescent colour that may be rotary moulded from a durable plastic such as polypropylene or polyethylene. The two segments are locked in place via the annulus stainless steel top electrode 21 and a tubular two part fastener (not shown) at the top of the unit. A simple braided cord carry handle (not shown) passes through this tubular fastener and is supplied with plastic tips that will screw or clip together.

Figure 9:
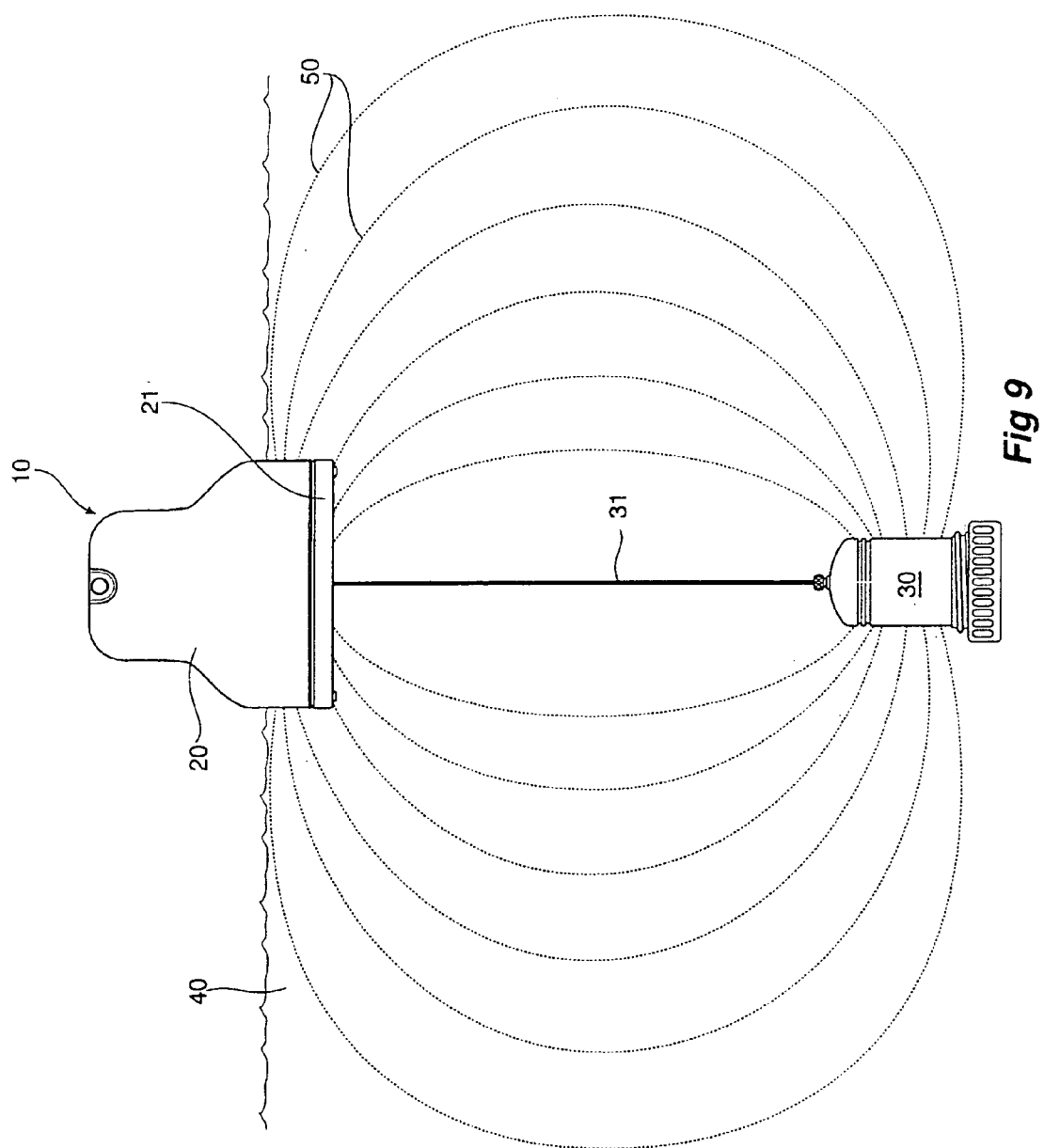
FIG. 9 shows the device of FIG. 7 in use in a body of water.

FIG. 9 shows the modified device of FIGS. 7 and 8 in use in a body of water.

The above has been described in the context of a specific embodiment and it will be appreciated by those skilled in the art that many variations and modifications may be made within the general inventive concept of the present invention.

The invention claimed is:

1. A device for repelling selected aquatic creatures, the device compnsing:

a buoy including an electromagnetic field generator and a first electrode and a second electrode electrically connected to said electromagnetic field generator when in use, for generating an electromagnetic field therebetween that repels selected aquatic creatures, wherein at least the first electrode is a conductive outer cover of the buoy and the second electrode is a drop-down electrode.

2. A device according to claim 1 wherein the buoy includes an on-board power supply.

3. A device according to claim 1 wherein the buoy is connectable to an external power supply for providing power to the electric field generator.

4. A device according to claim 1 wherein the buoyancy of the buoy is variably adjustable.

5. A device according to claim 1 wherein the buoy includes at least one tether point to allow the buoy to be tethered to an object, including at least one other buoy.

6. An array for repelling selected aquatic creatures, the array comprising a plurality of repelling devices according to claim 1 wherein the plurality of repelling devices are tethered together.

7. An array according to claim 6 wherein the array defines a row of repelling devices.

8. An array according to claim 6 wherein the array defines a plane.

9. An array according to claim 6 wherein the array defines a volume.

10. A device according to claim 1 wherein the selected aquatic creature is a shark.

11. A method of repelling selected aquatic creatures, the method comprising tethering two or more devices according to claim 1 to form a row of repelling devices.

12. A method of repelling selected aquatic creatures, the method comprising tethering a plurality of devices according to claim 1 to form a plane.

13. A method of repelling selected aquatic creatures, the method comprising tethering a plurality of repelling devices according to claims 1 to define a volume.

* * * * *